(12) United States Patent
Peled

(10) Patent No.: US 8,713,204 B2
(45) Date of Patent: Apr. 29, 2014

(54) HIGH-PERFORMANCE AHCI INTERFACE

(75) Inventor: Arie Peled, Tel Mond (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/560,152

(22) Filed: Jul. 27, 2012

(65) Prior Publication Data

US 2013/0166781 A1      Jun. 27, 2013

Related U.S. Application Data

(60) Provisional application No. 61/580,324, filed on Dec. 27, 2011.

(51) Int. Cl.
*G06F 3/00* (2006.01)
(52) U.S. Cl.
USPC .................................................. 710/5; 710/36
(58) Field of Classification Search
None
See application file for complete search history.

(56) References Cited

U.S. PATENT DOCUMENTS

| | | | | |
|---|---|---|---|---|
| 6,141,707 | A * | 10/2000 | Halligan et al. | 710/36 |
| 7,320,050 | B2 | 1/2008 | Kobayashi et al. | |
| 7,464,228 | B2 | 12/2008 | Chan et al. | |
| 8,281,043 | B2 * | 10/2012 | Edwards et al. | 710/5 |
| 8,458,381 | B2 * | 6/2013 | Holty et al. | 710/52 |
| 8,595,522 | B2 | 11/2013 | Cooper et al. | |
| 2009/0006670 | A1 * | 1/2009 | Guok et al. | 710/36 |
| 2009/0172257 | A1 | 7/2009 | Prins et al. | |
| 2010/0067133 | A1 | 3/2010 | Ooi | |
| 2010/0161936 | A1 | 6/2010 | Royer et al. | |
| 2011/0072173 | A1 | 3/2011 | Holty et al. | |
| 2011/0131360 | A1 * | 6/2011 | Noeldner et al. | 710/308 |

FOREIGN PATENT DOCUMENTS

| | | |
|---|---|---|
| JP | H04-190435 A | 7/1992 |
| JP | H05-189154 A | 7/1993 |
| JP | H11-167557 A | 6/1999 |
| JP | 2011-048691 A | 3/2011 |

OTHER PUBLICATIONS

International Search Report and Written Opinion in application No. PCT/US 12/65428 mailed Jan. 29, 2013 pp. 1-13.
Office Action from Korean Patent Application No. 10-2012-153134, mailed Jan. 15, 2014, English and Korean Versions, pp. 1-10.
Non-Final Office Action and translation thereof for corresponding Japanese Patent Application No. 2012-289464, Jan. 27, 2014, pp. 1-6.

* cited by examiner

*Primary Examiner* — Elias Mamo
(74) *Attorney, Agent, or Firm* — Meyertons, Hood, Kivlin, Kowert & Goetzel, P.C.

(57) ABSTRACT

A method includes receiving from a host multiple commands for execution in a memory, in accordance with a storage protocol that supports processing of only a single command at any given time. At a first time, a first command is executed in the memory and data related to the first command is exchanged with the host, even though a second command, different from the first command, is selected to serve as the single command for which the processing is currently supported in accordance with the storage protocol. A progress of the first command is reported to the host at a second time, which is later than the first time, upon detecting that the first command is selected to serve as the single command for which the processing is currently supported.

21 Claims, 2 Drawing Sheets

HIGH-PERFORMANCE AHCI INTERFACE

CROSS-REFERENCE TO RELATED APPLICATIONS

This application claims the benefit of U.S. Provisional Patent Application 61/580,324, filed Dec. 27, 2011, whose disclosure is incorporated herein by reference.

FIELD OF THE INVENTION

The present invention relates generally to data storage, and particularly to methods and systems for concurrent execution of memory commands.

BACKGROUND OF THE INVENTION

Various storage protocols for communicating with storage devices are known in the art. One example storage protocol is the Serial Advanced Technology Attachment (SATA) protocol. A protocol called Advanced Host Controller Interface (AHCI) specifies the exchange of data between host system memory and attached storage devices using the SATA protocol.

SATA is specified, for example, in "Serial ATA International Organization: Serial ATA Revision 3.0," Jun. 2, 2009, which is incorporated herein by reference. AHCI is specified, for example, in "Serial ATA Advanced Host Controller Interface (AHCI)," revision 1.3, Jun. 26, 2008, which is incorporated herein by reference.

SUMMARY OF THE INVENTION

An embodiment of the preset invention that is described herein provides a method including receiving from a host multiple commands for execution in a memory, in accordance with a storage protocol that supports processing of only a single command at any given time. At a first time, a first command is executed in the memory and data related to the first command is exchanged with the host, even though a second command, different from the first command, is selected to serve as the single command for which the processing is currently supported in accordance with the storage protocol. A progress of the first command is reported to the host at a second time, which is later than the first time, upon detecting that the first command is selected to serve as the single command for which the processing is currently supported.

In some embodiments, the storage protocol includes an Advanced Host Controller Interface (AHCI) protocol. In an embodiment, executing the first command includes refraining from reporting the progress of the first command at the first time. In a disclosed embodiment, executing the first command includes caching the progress of the first command at the first time, and reporting the progress includes reporting the cached progress to the host at the second time. In an example embodiment, the host provides one or more registers for reporting the progress of the single command whose processing is supported, and reporting the progress includes updating the registers with the cached progress.

In another embodiment, exchanging the data includes exchanging two or more portions of the data related to the first command interleaved with additional data related to at least one other command. In yet another embodiment, exchanging the data includes exchanging the data related to the first command with the host even though the first command is not the single command for which the processing is currently supported in accordance with the storage protocol.

In still another embodiment, executing the first command includes executing the first command even though the first command is not the single command for which the processing is currently supported in accordance with the storage protocol. In an embodiment, receiving the commands includes accepting the commands from the host in a first order, and executing the commands in a second order, different from the first order. Exchanging the data may include transferring the data to or from a host memory in the host, without involving a processor of the host.

There is additionally provided, in accordance with an embodiment of the present invention, apparatus including a memory and a memory controller. The memory controller is configured to receive from a host multiple commands for execution in the memory, in accordance with a storage protocol that supports processing of only a single command at any given time, to execute a first command in the memory and to exchange data related to the first command with the host at a first time, even though a second command, different from the first command, is selected to serve as the single command for which the processing is currently supported in accordance with the storage protocol, and to report a progress of the first command to the host at a second time, which is later than the first time, upon detecting that the first command is selected to serve as the single command for which the processing is supported.

There is also provided, in accordance with an embodiment of the present invention, a system including a host and a storage device. The storage device is configured to receive from the host multiple commands for execution in a memory of the storage device, in accordance with a storage protocol that supports processing of only a single command at any given time, to execute a first command in the memory and to exchange data related to the first command with the host at a first time, even though a second command, different from the first command, is selected to serve as the single command for which the processing is currently supported in accordance with the storage protocol, and to report a progress of the first command to the host at a second time, which is later than the first time, upon detecting that the first command is selected to serve as the single command for which the processing is supported.

The present invention will be more fully understood from the following detailed description of the embodiments thereof, taken together with the drawings in which:

DETAILED DESCRIPTION OF EMBODIMENTS

Overview

Figure 1:
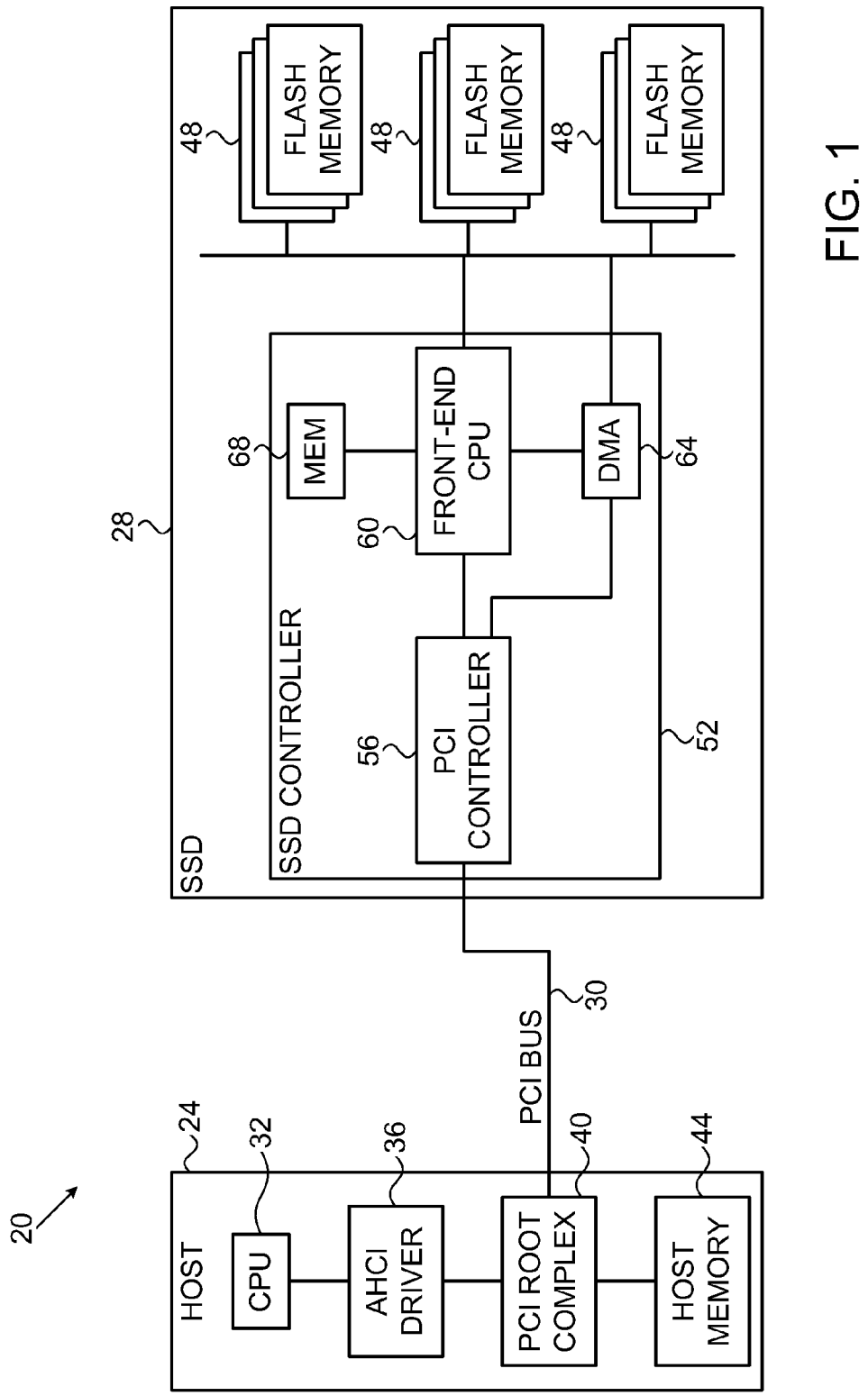
FIG. 1 is a block diagram that schematically illustrates a data storage system, in accordance with an embodiment of the present invention.

Some storage protocols allow a storage device to receive and process multiple storage commands concurrently and possibly out of order. The SATA protocol, for example, supports a Native Command Queuing (NCQ) mode in which a host may issue up to thirty-two outstanding commands to a storage device. This feature enables suitable storage devices to execute the commands with high efficiency and small latency.

The AHCI storage protocol is defined over SATA, and provides a standardized interface and data structures for direct data exchange between storage devices and the host memory. AHCI, however, specifies data transfer and progress reporting for only a single command at any given time.

Embodiments of the present invention that are described herein provide improved methods and systems for data storage, which enable a storage device to process multiple commands concurrently and out of order, and at the same time be compliant with AHCI. Although the embodiments described herein refer mainly to AHCI, the disclosed techniques can also be used with other storage protocols that support processing of only a single command at a time.

In some embodiments, a storage device comprises a memory and a controller. The controller receives from a host commands, and executes the commands in the memory. In accordance with the AHCI protocol, a single command is selected at any given time, and data transfer and progress reporting is permitted only for this single command. Nevertheless, in the disclosed embodiments the controller executes multiple commands concurrently and possibly transfers data out-of-order, for a single command or interleaved data of several commands, e.g., according to some internal scheduling preferences of the storage device.

If a command being executed is different from the single command whose processing is currently supported according to the AHCI protocol, the controller exchanges the data related to the executed command directly with the host memory, but refrains from reporting the progress of the command to the host using the appropriate AHCI registers. Instead, the controller caches the progress of the command, and reports the progress to the host only later, when the command in question is selected as the single command according to the AHCI protocol. In addition, if data from a specific command is transferred in an out-of-order fashion, the progress reporting will typically occur only for the ordered part of the data transfer.

In other words, the controller executes the multiple received commands concurrently and possibly out-of-order or in an interleaved fashion, regardless of which command is currently selected for processing by the AHCI protocol. The controller typically exchanges the data of each executed command directly with the host memory as soon as the data is available or required, and therefore eliminates the need to buffer the data. The data of multiple different commands may be exchanged with the host memory in an interleaved manner, as desired.

In order to remain compliant with the AHCI protocol, however, the controller postpones the progress reporting of the executed command until the command is selected to serve as the single command whose processing is permitted by the AHCI protocol. Thus, in some cases the host will have data from a certain command exchanged with its memory by the storage device controller, but the progress report for this command will arrive later. Decoupling the data transfer from the progress reporting in this manner does not violate the AHCI protocol.

The disclosed technique enables the memory device to enjoy the performance benefits of concurrent and out-of-order command execution, and at the same time to comply with the AHCI specifications. No data buffering is required, since the data is transferred to the host memory as soon as it is produced, and no modification of AHCI drivers is needed in the host.

System Description

FIG. 1 is a block diagram that schematically illustrates a data storage system 20, in accordance with an embodiment of the present invention. System 20 comprises a host 24 that stores data in a storage device, in the present example a Solid State Drive (SSD) 28. Host and SSD 28 communicate with one another over a Peripheral Component Interconnect (PCI) or PCI-express (PCIe) bus 30.

Host 24 may comprise, for example, a personal computer or mobile computing or communication device, or an enterprise system. In alternative embodiments, the disclosed techniques can be used with any other suitable type of storage device and with various other hosts.

Host 24 is configured to store data in SSD 28 in accordance with the AHCI protocol, cited above. SSD 28 is configured to carry out multiple storage commands in parallel and possibly out of order, and at the same time comply with the AHCI specifications, using techniques that are described in detail below.

Host 24 comprises a Central Processing Unit (CPU) 32, which communicates with SSD 28 using an AHCI driver 36 and a PCI root complex 40. AHCI driver 36 allocates commands for execution, prepares link lists for data transfer and reports the completion of each command to higher software layers. The Driver sets the specified Memory-Mapped I/O (MMIO) registers, data structures in host CPU memory structures for executing the pending commands Host 24 comprises a host memory 44, typically a Random Access Memory (RAM). Host memory 44 may serve various functions in the host. In accordance with the AHCI specification, SSD 28 typically exchanges data directly with the host memory, e.g., stores data that was retrieved in a read command, or reads data that is to be written in a write command.

SSD 28 comprises a non-volatile memory, which is used for storing data provided by host 24. In the present example, the non-volatile memory comprises multiple NAND Flash memory devices 48. In alternative embodiments, the non-volatile memory may comprise any other suitable type of memory. An SSD controller 52 carries out the various functions of the SSD, including, for example, data storage and retrieval in Flash devices 48 and interfacing with host 24 using the disclosed techniques. The terms "SSD controller" and "memory controller" are used interchangeably herein.

In the example of FIG. 1, SSD controller 52 comprises a PCI controller, which serves as the PCI interface between the SSD and the host. A front-end CPU 60 runs software that manages the AHCI protocol operation of the SSD controller, amongst other functions. A Direct Memory Access (DMA) module 64 exchanges data directly (i.e., without involving CPU 32) with host memory 44 over bus 30. An internal memory 68, typically a Dynamic RAM (DRAM), is used for internal storage in the SSD controller. Typically, the interfacing and communication processes described herein are carried out by front-end CPU 60, using the other elements of SSD controller 52.

SSD controller 52, including PCI controller 56, front-end CPU 60 and/or DMA module 64, may be implemented in hardware. Alternatively, certain functions of the SSD controller, for example the functions of CPU 60, may be implemented using a microprocessor that runs suitable software, or by a combination of hardware and software elements. In some embodiments, CPU 60 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The system configuration of FIG. 1 is an example configuration, which is shown purely for the sake of conceptual clarity. Any other suitable system configuration can also be used. For example, in some embodiments two or more SSDs may be connected to the same host. Elements that are not necessary for understanding the principles of the present invention, such as various interfaces, addressing circuits, timing and sequencing circuits and debugging circuits, have been omitted from the figure for clarity.

In the exemplary SSD configuration shown in FIG. 1, memory devices 48 and SSD controller 52 are implemented as separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD controller circuitry may reside on the same die on which one or more of memory devices 48 are disposed. Further alternatively, some or all of the functionality of SSD controller 52 can be implemented in software and carried out by host 24, or by any other type of memory controller. In some embodiments, host 24 and SSD controller 52 may be fabricated on the same die, or on separate dies in the same device package.

AHCI-Compliant Concurrent Command Execution

Although the SATA protocol supports execution of multiple storage commands concurrently, the protocol and data structures of the AHCI specification support execution and progress reporting for only a single command at a time. In accordance with AHCI, the host may issue multiple outstanding commands to a storage device. The storage device, however, can select commands for execution out-of-order, but should not interleave data of several commands or return data of a specific command out-of-order.

Typically, AHCI driver 36 in host 24 selects a single command out of the multiple outstanding commands at a given time. Data transfer and progress reporting is supported only for that single command. When execution of the single currently-selected command is completed, the AHCI driver chooses another command for execution. This kind of sequential in-order operation may degrade the SSD storage performance considerably, e.g., increase latency and reduce throughput.

In some embodiments, SSD controller 52 complies with the above restrictions of the AHCI protocol, and uses the standard protocol and data structures of AHCI. Nevertheless, the SSD controller executes multiple commands concurrently and possibly delivers data of a specific command out-of-order. This feature is achieved by decoupling the transfer of data from the reporting of progress.

From the perspective of AHCI driver 36 in the host, the SSD is expected to execute only the currently-selected command, to exchange data related to the command with host memory 44 using DMA module 64, and to update the host with the progress of the command, until command execution is completed. The AHCI driver provides suitable commands and data structures for this flow, including registers for reporting the command execution progress.

In some embodiments, SSD controller 52 receives multiple storage commands (e.g., read and write commands) from host 24. The SSD controller executes the commands in memory devices 48 in accordance with some scheduling preferences of SSD 28, not necessarily in the order the commands were received from the host. Moreover, the SSD controller executes a given command regardless of whether this command is currently selected for execution by the AHCI driver or not.

When executing a certain command, the SSD controller exchanges data related to the command with host memory 44. For example, when executing a write command, the SSD controller reads the data for storage from the host memory and stores the data in Flash devices 48. In a read command, the SSD controller stores in host memory 44 data that was retrieved from Flash devices 48.

The SSD controller carries out the above-described data exchange regardless of whether the executed command is the single command that is currently chosen for execution by AHCI driver 36. Thus, the SSD controller has the freedom to execute the commands efficiently, out of order, according to some suitable preference, policy or criteria. Since the data is exchanged with the host memory as soon as it is available during command execution, no buffering is needed in the SSD controller.

Consider a scenario in which the SSD controller executes a command that is not currently selected for execution by the AHCI driver. In such a case, the AHCI driver does not provide means for the SSD to report the execution progress of this command. (At this time, the AHCI driver actually expects progress reporting for a different command—The single command that is currently selected by the AHCI driver.) Thus, in some embodiments the SSD controller postpones the progress reporting for the currently-executed command, until a later time at which this command will be selected by the AHCI driver.

In some embodiments, AHCI driver 36 provides one or more registers, using which the SSD is expected to report the execution progress of the single command that is currently selected by the AHCI driver. When executing a command that is not currently selected by the AHCI driver, SSD controller 52 typically caches the progress report for the command being executed, e.g., in internal registers in memory 68. Later, when this command is selected by the AHCI driver for execution, the SSD controller updates the AHCI driver registers with the cached progress report of the command.

When using the disclosed technique, the SSD controller often exchanges data with the host memory for a command that is currently being executed but is not selected for execution by the AHCI driver. Since the progress report for this command is postponed, the AHCI driver is typically unaware that the data has been exchanged or that the command execution is complete. The AHCI driver becomes aware that the command is completed and that the data has been exchanged only later, when it selects the command and receives the appropriate progress report.

Moreover, using this technique the SSD controller may exchange the data of two or more commands with the host memory in an interleaved manner, i.e., alternate between transferring portions of data for different commands, as desired. After the execution of a given command is complete, and all the relevant data has been exchanged with the host memory, the SSD controller will report this progress to the host. This sort of operation does not violate the AHCI specifications, since each command is typically pre-allocated a dedicated space in host memory 44. On the other hand, this sort of operation enables considerable parallelism and thus performance improvement.

Figure 2:
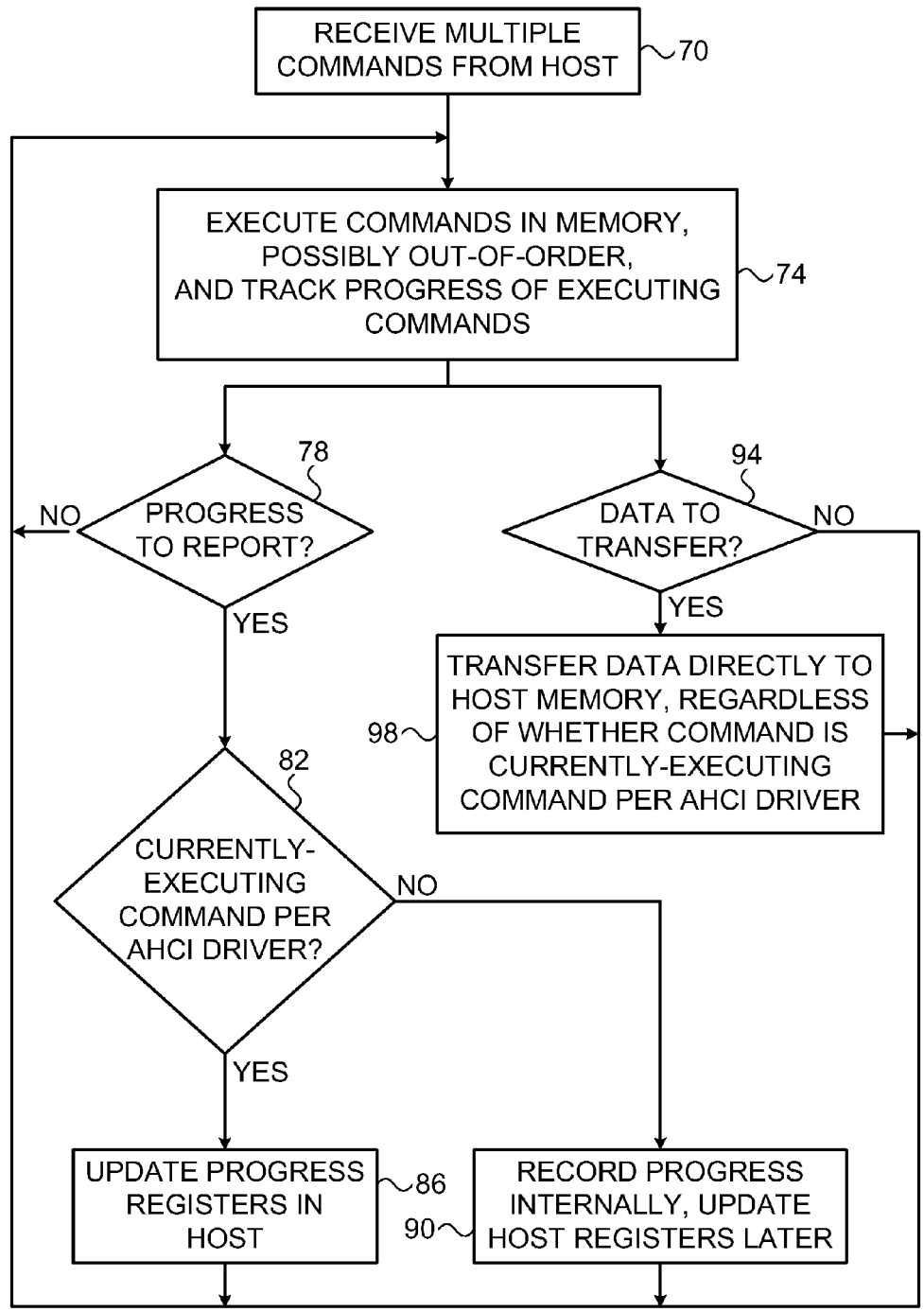
FIG. 2 is a flow chart that schematically illustrates a method for concurrent AHCI-compliant execution of multiple commands, in accordance with an embodiment of the present invention.

FIG. 2 is a flow chart that schematically illustrates a method for concurrent AHCI-compliant execution of multiple commands, in accordance with an embodiment of the present invention. The method begins with SSD controller 52 of SSD 28 receiving multiple storage commands from host 24, at an input step 70.

SSD controller 52 executes the multiple commands in Flash devices 48, at an execution step 74. The SSD controller typically executes the commands in accordance with some internal scheduling preference, possibly concurrently and possibly out of order. The command execution is carried out irrespective of which command is currently selected for execution by AHCI driver 36 in the host. During execution, the SSD controller tracks the progress of the various commands, for example which commands are still in progress and which are completed.

During execution of the multiple commands, SSD controller 52 checks whether any of the commands has a progress update that should be reported to the host, at a report checking step 78. If not, the method loops back to step 74 above. If a given command has a progress update that should be reported, the SSC controller checks whether this command is the single command that is currently selected for execution by AHCI driver 36 in accordance with the AHCI specification, at a selection checking step 82.

If the command in question is the currently-selected command from the perspective of the AHCI driver, the SSD controller reports the progress of this command by updating the appropriate AHCI registers, at a progress reporting step 86. Otherwise, the SSD controller postpones the progress report, at a postponing step 90. The SSD controller typically caches the progress report, and updates the AHCI registers at a later time, upon detecting that the command in question is selected for execution by the AHCI driver. The method then loops back to step 74 above.

During execution of the multiple commands, SSD controller 52 checks whether any of the commands has data to exchange with host memory 44, at a data checking step 94. If not, the method loops back to step 74 above. If a given command has data to exchange, the SSD controller transfers the data to or from the host memory, as applicable, at a data transferring step 98. The SSD controller transfers the data as soon as it is available or as soon as it is required, regardless of whether the given command is currently selected for execution by the AHCI driver. The method then loops back to step 74 above.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving, by a memory system from a host, multiple commands, wherein the memory system includes a memory controller and a plurality of memories, wherein each command of the multiple commands is executed by the memory controller in accordance with a storage protocol that specifies data transfer and progress reporting for commands in a given serial order;
at a first time, executing a first command in the memory controller and exchanging data related to the first command with the host, wherein a second command, different from the first command, is currently supported for execution in accordance with the storage protocol;
executing the second command and reporting progress of the second command to the host at a second time, which is later than the first time and
reporting a progress of the first command to the host at a third time, which is later than the second time, responsive to detecting that the first command is currently supported for execution in accordance with the storage protocol.

2. The method according to claim 1, wherein the storage protocol comprises an Advanced Host Controller Interface (AHCI) protocol.

3. The method according to claim 1, wherein executing the first command comprises refraining from reporting the progress of the first command at the first time.

4. The method according to claim 1, wherein executing the first command comprises caching the progress of the first command at the first time, and wherein reporting the progress comprises reporting the cached progress to the host at the second time.

5. The method according to claim 4, wherein the host provides one or more registers for reporting the progress of the single command whose processing is supported, and wherein reporting the progress comprises updating the registers with the cached progress.

6. The method according to claim 1, wherein exchanging the data comprises exchanging two or more portions of the data related to the first command interleaved with additional data related to at least one other command.

7. The method according to claim 1, wherein exchanging the data comprises exchanging the data related to the first command with the host even though the first command is not the single command for which the processing is currently supported in accordance with the storage protocol.

8. The method according to claim 1, wherein executing the first command comprises executing the first command even though the first command is not the single command for which the processing is currently supported in accordance with the storage protocol.

9. The method according to claim 1, wherein receiving the multiple commands comprises accepting the multiple commands from the host in a first order, and comprising executing the multiple commands in a second order, different from the first order.

10. The method according to claim 1, wherein exchanging the data comprises transferring the data to or from a host memory in the host, without involving a processor of the host.

11. Apparatus, comprising:
a memory; and
a memory controller configured to:
receive from a host multiple commands for execution in the memory, in accordance with a storage protocol that specifies data transfer and progress reporting for only a single command at any given time;
execute a first command in the memory and to exchange data related to the first command with the host at a first time, wherein a second command, different from the first command, is selected to serve as the single command for which processing is currently supported in accordance with the storage protocol; and report a progress of the first command to the host at a second time, which is later than the first time, upon detecting that the first command is selected to serve as the single command for which the processing is supported.

12. The apparatus according to claim 11, wherein the storage protocol comprises an Advanced Host Controller Interface (AHCI) protocol.

13. The apparatus according to claim 11, wherein the memory controller is configured to refrain from reporting the progress of the first command at the first time.

14. The apparatus according to claim 11, wherein the memory controller is configured to cache the progress of the first command at the first time, and to report the cached progress to the host at the second time.

15. The apparatus according to claim 14, wherein the host provides one or more registers for reporting the progress of the single command whose processing is supported, and wherein the memory controller is configured to report the progress by updating the registers with the cached progress.

16. The apparatus according to claim 11, wherein the memory controller is configured to exchange two or more portions of the data related to the first command interleaved with additional data related to at least one other command.

17. The apparatus according to claim 11, wherein the memory controller is configured to exchange the data related to the first command with the host even though the first command is not the single command for which the processing is currently supported in accordance with the storage protocol.

18. The apparatus according to claim 11, wherein the memory controller is configured to execute the first command even though the first command is not the single command for which the processing is currently supported in accordance with the storage protocol.

19. The apparatus according to claim 11, wherein the memory controller is configured to receive the multiple commands from the host in a first order, and to execute the multiple commands in a second order, different from the first order.

20. The apparatus according to claim 11, wherein the memory controller is configured to exchange the data with a host memory in the host, without involving a processor of the host.

21. A system, comprising:
a host; and
a storage device, which is configured to:
receive from the host multiple commands for execution in a memory of the storage device, in accordance with a storage protocol that specifies data transfer and progress reporting for only a single command at any given time;
execute a first command in the memory and to exchange data related to the first command with the host at a first time, wherein a second command, different from the first command, is selected to serve as the single command for which the processing is currently supported in accordance with the storage protocol; and
report a progress of the first command to the host at a second time, which is later than the first time, upon detecting that the first command is selected to serve as the single command for which the processing is supported.

* * * * *